United States Patent
Wu et al.

(10) Patent No.: US 11,454,717 B2
(45) Date of Patent: Sep. 27, 2022

(54) MULTI-OBJECT TRACKING METHOD AND SYSTEM

(71) Applicant: Wistron Corporation, New Taipei (TW)

(72) Inventors: Fang-Ming Wu, New Taipei (TW); Wen-Chieh Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 505 days.

(21) Appl. No.: 16/141,391

(22) Filed: Sep. 25, 2018

(65) Prior Publication Data

US 2020/0018843 A1    Jan. 16, 2020

(30) Foreign Application Priority Data

Jul. 13, 2018    (TW) .................................. 107124174

(51) Int. Cl.
  *G01S 13/72* (2006.01)
  *G01S 7/41* (2006.01)
  *G01S 7/35* (2006.01)
  *G06N 20/00* (2019.01)
  *G06F 16/29* (2019.01)

(52) U.S. Cl.
  CPC ............ *G01S 13/726* (2013.01); *G01S 7/352* (2013.01); *G01S 7/41* (2013.01); *G06F 16/29* (2019.01); *G06N 20/00* (2019.01)

(58) Field of Classification Search
  CPC ........... G01S 13/726; G01S 7/352; G01S 7/41
  USPC ........................................ 342/195, 149, 167
  See application file for complete search history.

(56) References Cited

U.S. PATENT DOCUMENTS

| 7,181,529 B2 * | 2/2007 | Bhatia | H04L 67/53 709/219 |
| 9,635,514 B2 * | 4/2017 | Gilbert | H04W 4/027 |
| 2016/0363663 A1 * | 12/2016 | Mindell | G01S 13/82 |

FOREIGN PATENT DOCUMENTS

| CN | 102822759 A | 12/2012 |
| CN | 107631867 A | 1/2018 |
| TW | 201638816 A | 11/2016 |

OTHER PUBLICATIONS

Office Action dated Jan. 16, 2020 in corresponding Taiwan Patent Application No. 107124174.
Office Action dated Nov. 10, 2021, in corresponding Chinese Patent Application No. 201810891105.9.

* cited by examiner

*Primary Examiner* — Bo Fan
(74) *Attorney, Agent, or Firm* — Donald E. Stout; Stout, Uxa & Buyan, LLP (57) ABSTRACT

A multi-object tracking method includes generating multi-dimensional physical characterization data associated with a plurality of objects; simplifying the multi-dimensional physical characterization data to reduce at least one dimension thereof, thereby resulting in a simplified data set; and tracking by comparing a current simplified data set and a stored data set in a database. If the current simplified data set conforms to the stored data set in the database, a proper operation is correspondingly performed; otherwise the current simplified data set is defined as a new event and stored in the database.

20 Claims, 9 Drawing Sheets

| data sample | detected noise energy on PCB | mechanical characteristic X-axis position | mechanical characteristic Y-axis position | mechanical characteristic Z-axis position | shaft angle 1 | shaft angle 2 | shaft angle 3 |
|---|---|---|---|---|---|---|---|
| point 1 | energy-1 | X-1 | Y-1 | Z-1 | A1-1 | A2-1 | A3-1 |
| point 2 | energy-2 | X-2 | Y-2 | Z-2 | A1-2 | A2-2 | A3-2 |
| point 3 | energy-3 | X-3 | Y-3 | Z-3 | A1-3 | A2-3 | A3-3 |
| ... | ... | ... | ... | ... | ... | ... | ... |
| point n | energy-n | X-n | Y-n | Z-n | A1-n | A2-n | A3-n |

| time \ data | strength | frequency | position | speed |
|---|---|---|---|---|
| time-1 | strength-1 | frequency-1 | position-1 | speed-1 |
| time-2 | strength-2 | frequency-2 | position-2 | speed-2 |
| time3 | strength-3 | frequency-3 | position-3 | speed-3 |
| ... | ... | ... | ... | ... |
| time-n | strength-n | frequency-n | position-n | speed-n |

| data \ sample | detected noise energy on PCB | mechanical characteristic X-axis position | mechanical characteristic Y-axis position | mechanical characteristic Z-axis position | shaft angle 1 | shaft angle 2 | shaft angle 3 |
|---|---|---|---|---|---|---|---|
| point 1 | energy-1 | X-1 | Y-1 | Z-1 | A1-1 | A2-1 | A3-1 |
| point 2 | energy-2 | X-2 | Y-2 | Z-2 | A1-2 | A2-2 | A3-2 |
| point 3 | energy-3 | X-3 | Y-3 | Z-3 | A1-3 | A2-3 | A3-3 |
| ... | ... | ... | ... | ... | ... | ... | ... |
| point n | energy-n | X-n | Y-n | Z-n | A1-n | A2-n | A3-n |

FIG. 7B

MULTI-OBJECT TRACKING METHOD AND SYSTEM

CROSS-REFERENCE TO RELATED APPLICATIONS

This application claims priority to Taiwan Patent Application No. 107124174, filed on Jul. 13, 2018, the entire contents of which are herein expressly incorporated by reference.

BACKGROUND OF THE INVENTION

1. Field of the Invention

The present invention generally relates to a tracking system, and more particularly to a multi-object tracking system and method.

2. Description of Related Art

A tracking (or monitoring) system captures status of an object, according to which a proper feedback process may be carried out in time. If less data (e.g., single-dimensional or univariate data) are captured by the tracking system, data may be quickly processed but variation in an interfered environment and misjudgment may occur due to insufficient data. To the contrary, if more data (e.g., multi-dimensional data) are captured by the tracking system, data cannot be timely processed and analyzed by a conventional processor.

The conventional tracking system usually uses a three-dimensional accelerometer as a monitoring component, which is commonly coupled with equipment, however, in an invasive manner, and therefore may damage the original structure of the equipment and is not liable to be installed in movable equipment. A (light-sensing) laser is another monitoring component commonly used in the conventional tracking system. The laser may be installed externally to equipment for monitoring. However, the laser has high directivity, and thus may be used for monitoring a single object. Moreover, the laser can obtain only time of flight, which limits its applicability.

For some tracking applications, such as signal detection on a printed circuit board, large manpower is required, and the measurement made by the inspector is highly subjective. The layout and routing of various modules on the printed circuit board may result in different noise, which affects efficiency and increases uncertainty. A need has thus arisen to propose a novel mechanism capable of quickly finding locations where the problems locate and accordingly fixing the problems.

SUMMARY OF THE INVENTION

In view of the foregoing, it is an object of the embodiment of the present invention to provide a multi-object tracking system and method capable of effectively maintaining data reliability, reducing measurement errors, quick maintenance, and reducing manpower and time cost.

According to one embodiment, a multi-object tracking method includes: generating multi-dimensional physical characterization data associated with a plurality of objects; simplifying the multi-dimensional physical characterization data to reduce at least one dimension thereof, thereby resulting in a simplified data set; and tracking by comparing a current simplified data set and a stored data set in a database. If the current simplified data set conforms to the stored data set in the database, a proper operation is correspondingly performed; otherwise the current simplified data set is defined as a new event and stored in the database.

BRIEF DESCRIPTION OF THE DRAWINGS

FIG. 4A to FIG. 4C show exemplary simplified data sets through PCA;

DETAILED DESCRIPTION OF THE INVENTION

Figure 1A:
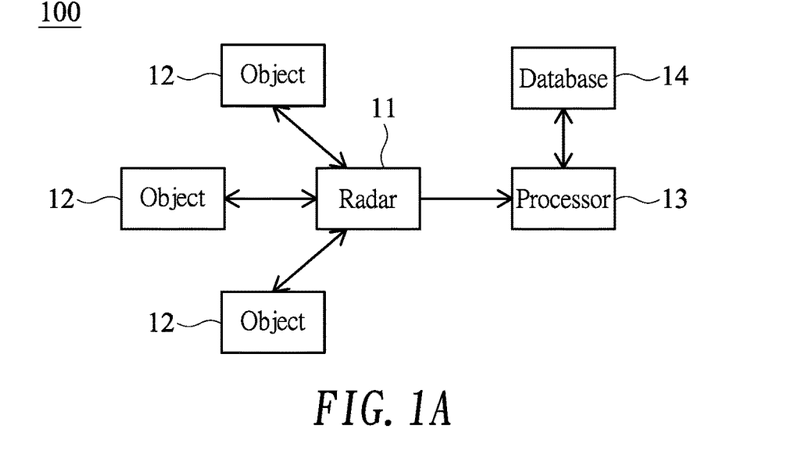
FIG. 1A shows a block diagram illustrating a multi-object tracking system according to a first embodiment of the present invention.
Figure 1B:
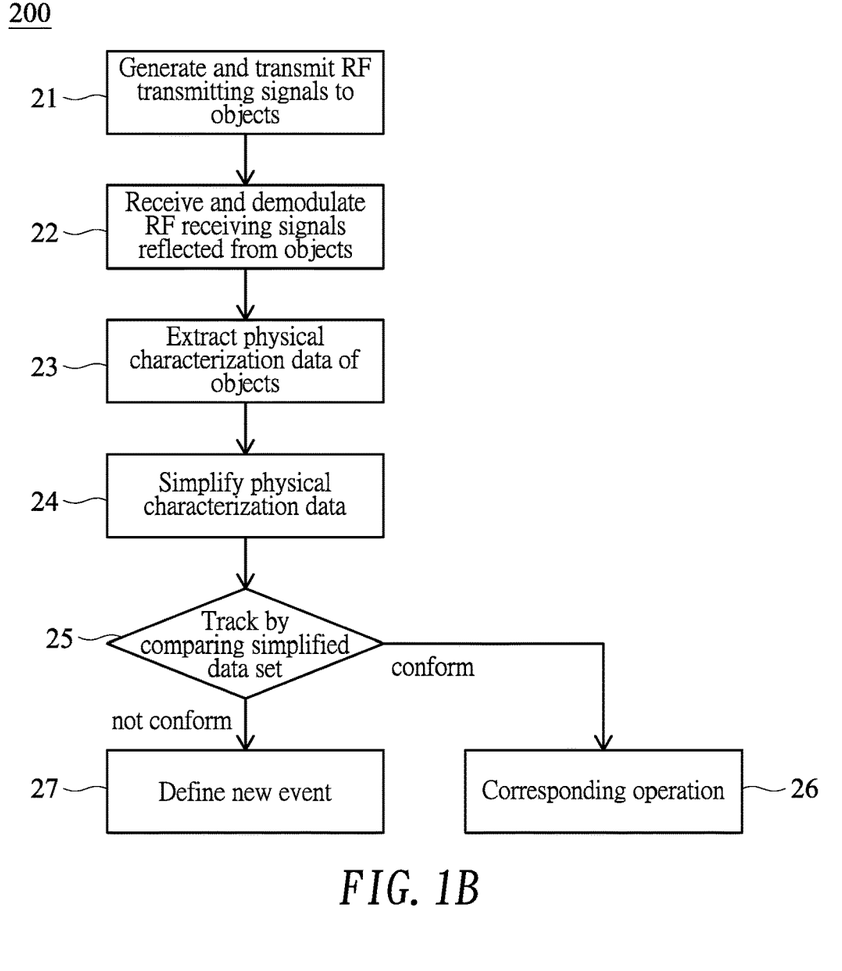
FIG. 1B shows a flow diagram illustrating a multi-object tracking method according to the first embodiment of the present invention.
Figure 2:
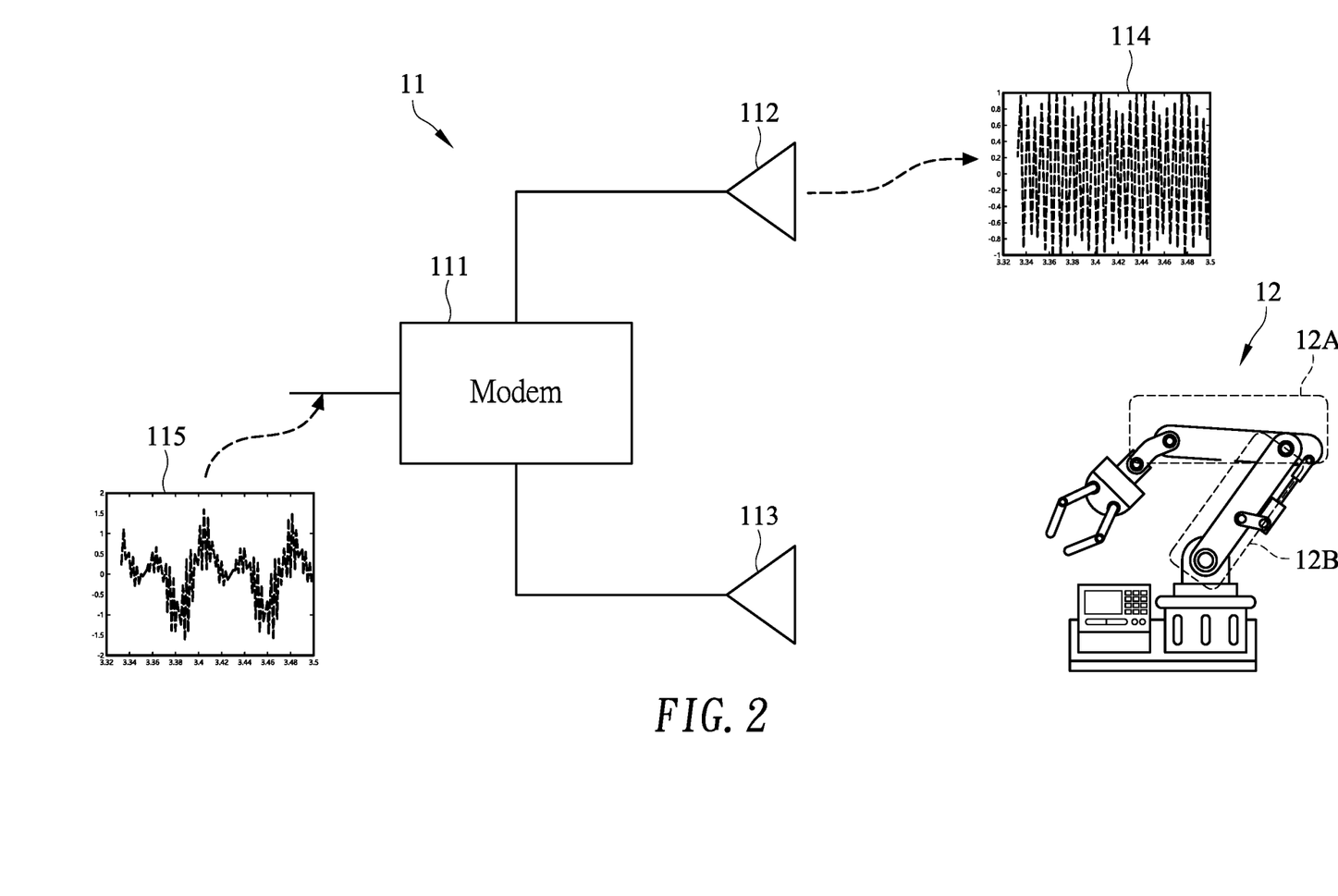
FIG. 2 shows a detailed block diagram exemplifying the radar of FIG. 1A.

FIG. 1A shows a block diagram illustrating a multi-object tracking system 100 according to a first embodiment of the present invention, and FIG. 1B shows a flow diagram illustrating a multi-object tracking method 200 according to the first embodiment of the present invention. In the embodiment, the multi-object tracking system 100 may include a radar 11, which may transmit and receive radio waves to detect a plurality of objects 12. The radar 11 of the embodiment may, but not necessarily, be a frequency-modulated continuous-wave (FM-CW) radar. FIG. 2 shows a detailed block diagram exemplifying the radar 11 of FIG. 1A. The radar 11 may include a modulator-demodulator (modem) 111, a transmitter 112 and a receiver 113. The modem 111 of the embodiment may be a FM-CW modem, the modulator of which generates FM-CW radio signals (i.e., radio-frequency (RF) transmitting signals) with a time-frequency waveform 114 as exemplified in FIG. 2. The RF transmitting signals are transmitted to multiple objects 12 via the transmitter 112 (step 21). In this example, the objects 12 may be an upper arm 12A and a lower arm 12B of a robot. However, the objects 12 may not be limited to the robot, but may, for example, be mechanical equipment with physical characterization, such as a motor rotating shaft. The receiver 113 may receive reflected signals (i.e., RF receiving signals) reflected from the object 12. The RF receiving signals are down-converted in frequency and demodulated by the demodulator of the modem 111, thus resulting in baseband signals with a time-frequency waveform 115 as exemplified in FIG. 2 (step 22). The objects 12 have different physical characteristics, for example, mechanical vibration or displacement, which reveals different variation such as relative position or speed. Therefore, the time-frequency waveform 115 of the down-converted demodulated (baseband) signals shows mixed signals with plural amplitudes and frequencies.

Figure 3A:
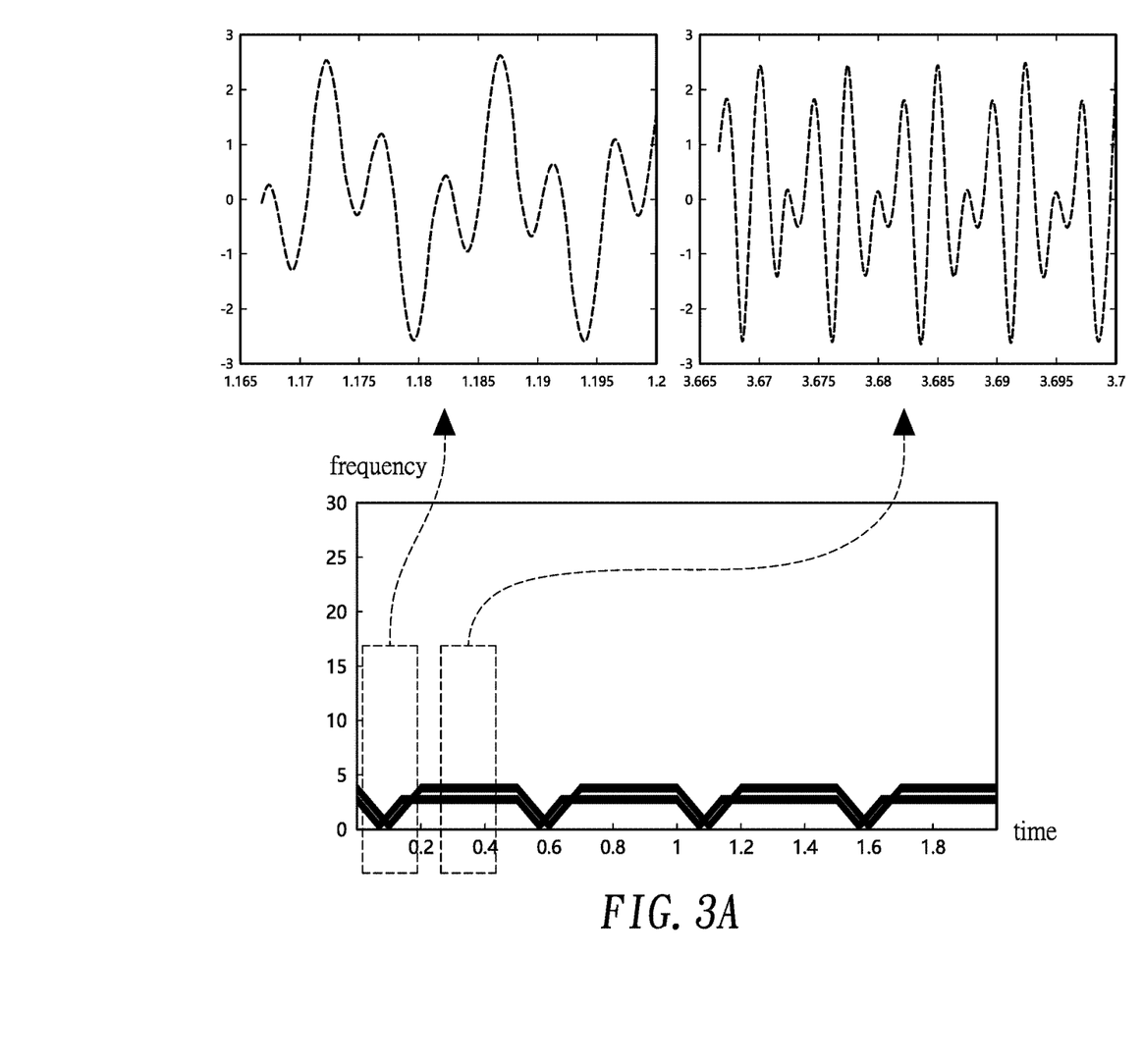
FIG. 3A shows a baseband time-frequency waveform of exemplary reflected signals through time-frequency analysis.
Figure 3B:
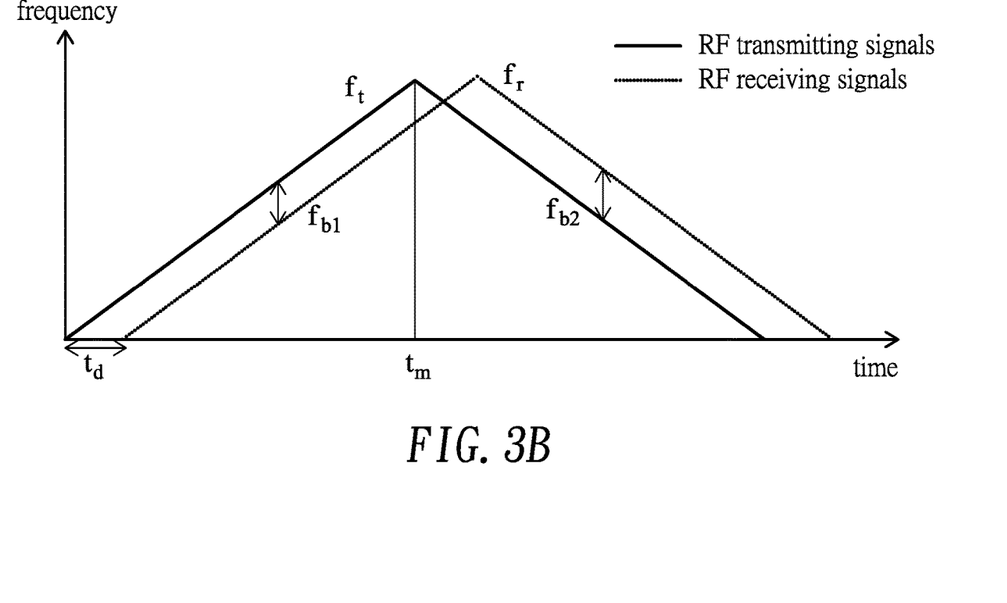
FIG. 3B shows a schematic diagram exemplifying down-converting and demodulating radio signals.

FIG. 3A shows a baseband time-frequency waveform of exemplary reflected signals through time-frequency analysis. According to the waveform of FIG. 3A, a waveform composed of mixed relative frequencies and signal energy values may be obtained when an object moves under normal relative speed. FIG. 3B shows a schematic diagram exemplifying down-converting and demodulating radio signals. As shown in FIG. 3B, the RF receiving signals have a delay time $t_d$ with respect to the RF transmitting signals. Beat signals may be obtained according to a rising edge and a falling edge of the RF transmitting/receiving signals, and accordingly relative position (distance) and speed may be obtained as follows:

$$\text{distance} = \left(\frac{f_{b2} + f_{b1}}{2}\right)\left(\frac{C \cdot t_m}{2\Delta f}\right)$$

$$\text{speed} = \left(\frac{f_{b2} - f_{b1}}{2}\right)\left(\frac{C}{2f_c}\right)$$

where $\Delta f$ represents a scan bandwidth of the radar 11, $t_m$ represents a cycle time of the radar 11, C represents the light speed, $f_{b1}$ represents a beat frequency difference at a rising edge between the RF transmitting signals and the RF receiving signals, $f_{b2}$ represents a beat frequency difference at a falling edge between the RF transmitting signals and the RF receiving signals.

Figure 3C:
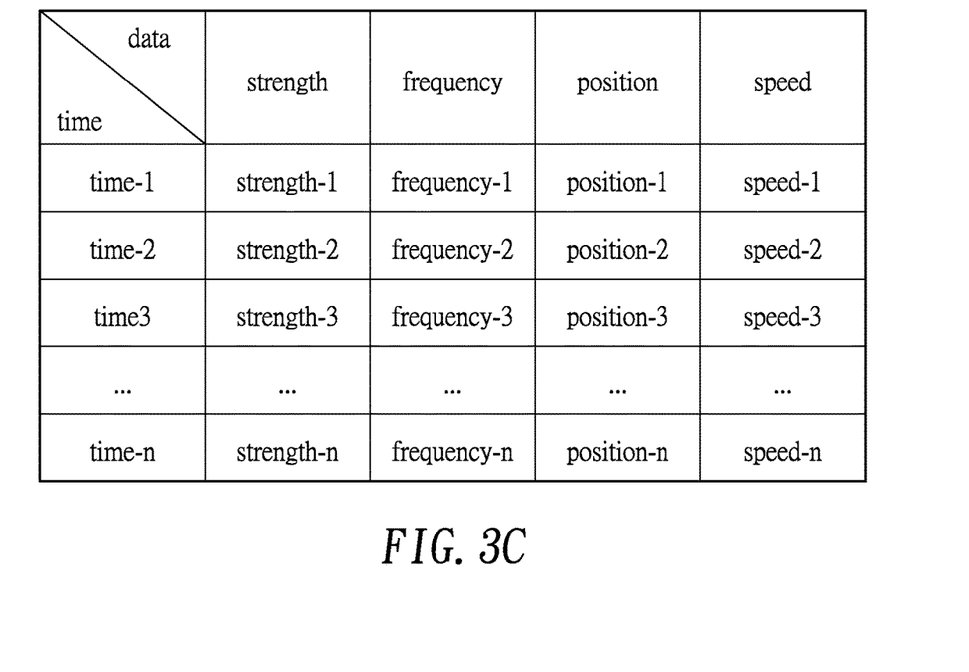
FIG. 3C shows exemplary physical characterization data extracted by the processor.

The multi-object tracking system 100 of the embodiment may include a processor 13, such as a computer, which may extract multi-dimensional physical characterization data (e.g., strength, frequency, position and speed) of the objects 12 at different times according to the RF transmitting signals and the RF receiving signals (step 23). FIG. 3C shows exemplary physical characterization data extracted by the processor 13. The extracted physical characterization data may include strength, frequency, position and speed, the dimension of which is four in this example. The extracted physical characterization data may then be stored in a database 14. In the embodiment, the processor 13 may extract multi-dimensional data such that variation and misjudgment resulted from single-dimensional data lacking of sufficient data may be thus prevented.

Subsequently, in step 24, the processor 13 may simplify the physical characterization data (extracted in step 23) by using principle component analysis (PCA). Accordingly, at least one dimension of the physical characterization data may be reduced while maintaining characteristics with variance that contributes the most among the data. The characteristic vector with a high characteristic value is maintained while ignoring the characteristic vector with a low characteristic value, the principle component of the data may thus be maintained. The simplified data set through PCA may then be stored in the database 14. In an alternative embodiment, in step 24, the processor 13 may simplify the physical characterization data (extracted in step 23) by using independent component analysis (ICA). ICA is a signal processing method adopted to separate a multivariate signal into additive subcomponents.

Figure 4A:
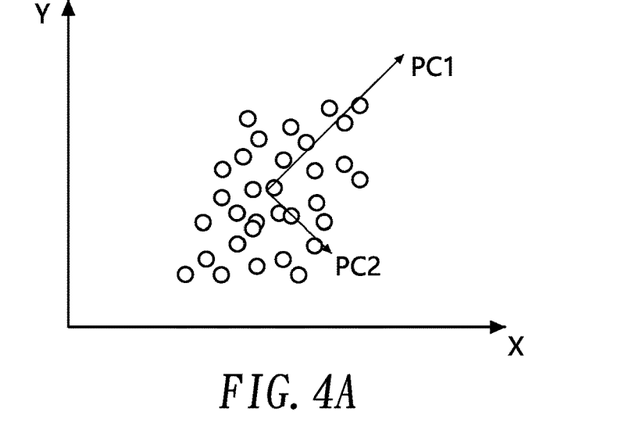
Figure 4B:
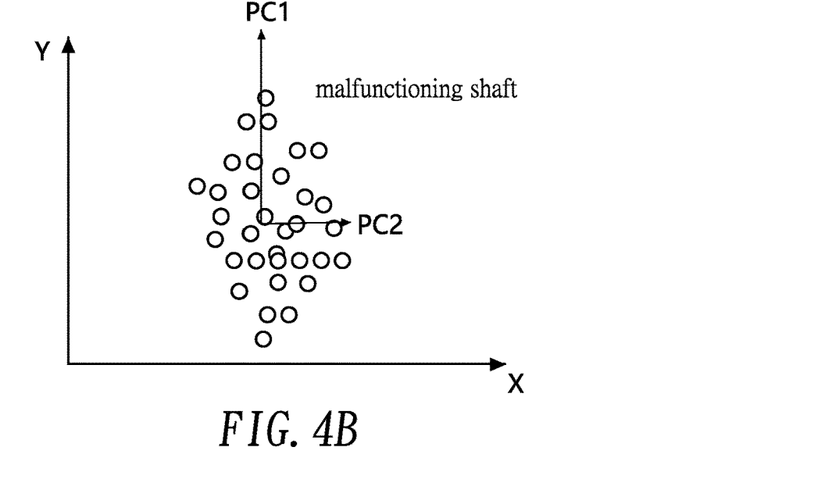
Figure 4C:
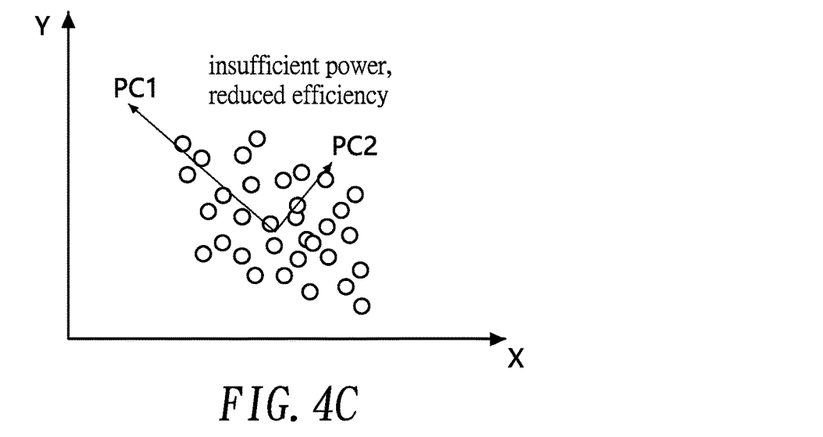

FIG. 4A to FIG. 4C show exemplary simplified data sets PC1/PC2 through PCA, which may be obtained by performing operations on data of FIG. 3C, where X axis represents distance and Y axis represents speed. FIG. 4A shows a simplified data set representing a normal event; FIG. 4B shows a simplified data set representing an abnormal event such as a robot arm with a malfunctioning shaft; and FIG. 4C shows a simplified data set representing another abnormal event such as insufficient power or reduced efficiency.

In step 25, the processor 13 may track by comparing a current simplified data set and a stored data set stored in the database 14. If the current simplified data set conforms to the stored data set in the database 14 (i.e., the current simplified data set exists in the database 14), a proper operation is correspondingly performed (step 26). If the current simplified data set does not conform to the stored data set in the database 14 (i.e., the current simplified data set does not exist in the database 14), the current simplified data set is defined as a new event according to detection result (step 27), and then stored in the database 14. In the embodiment, the database 14 may perform classification on the datasets by using a machine learning technique.

Figure 5A:
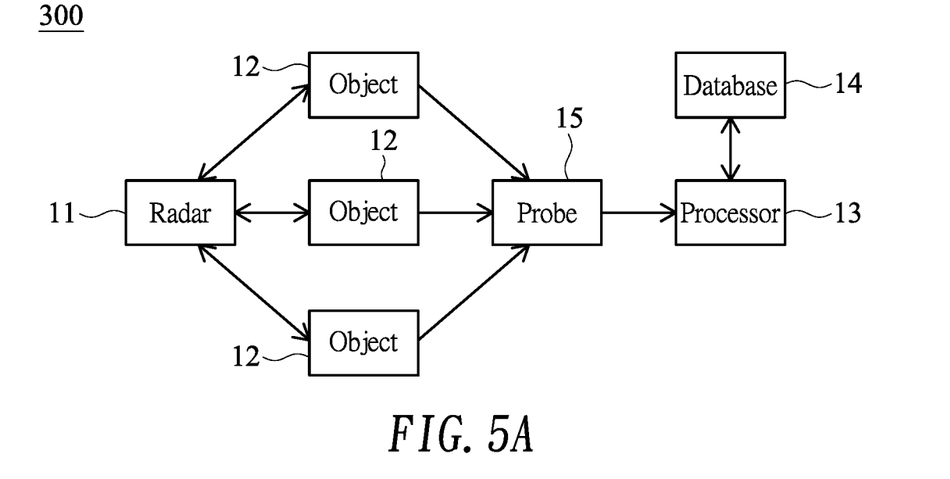
FIG. 5A shows a block diagram illustrating a multi-object tracking system according to a second embodiment of the present invention.
Figure 5B:
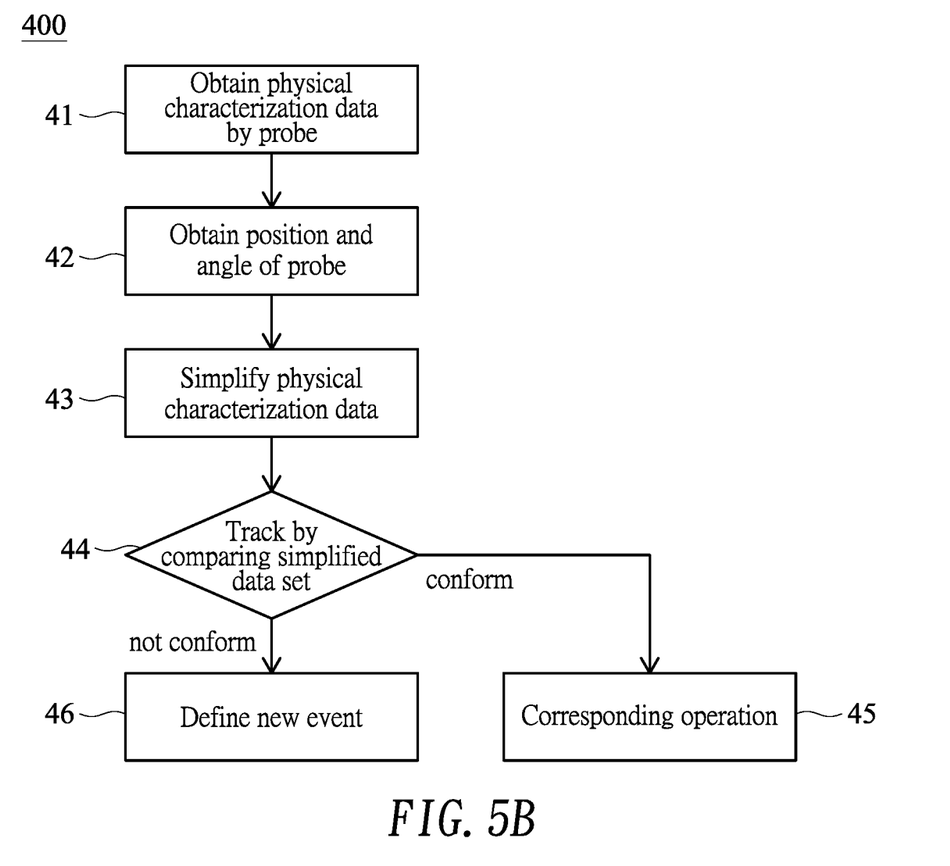
FIG. 5B shows a flow diagram illustrating a multi-object tracking method according to the second embodiment of the present invention.

FIG. 5A shows a block diagram illustrating a multi-object tracking system 300 according to a second embodiment of the present invention, and FIG. 5B shows a flow diagram illustrating a multi-object tracking method 400 according to the second embodiment of the present invention. In the embodiment, the multi-object tracking system 300 may include a probe 15, which may be disposed on a robot arm.

Figure 6A:
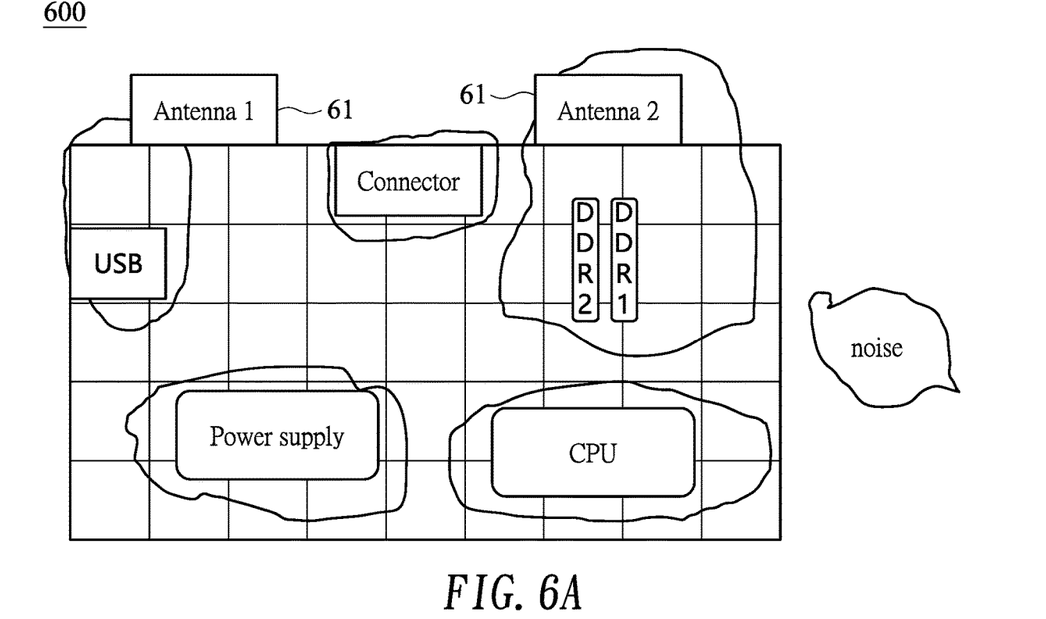
FIG. 6A schematically shows a printed circuit board (PCB) of a notebook computer.

FIG. 6A schematically shows a printed circuit board (PCB) 600 of a notebook computer. As various modules (e.g., universal serial bus (USB), connector, double data rate memory DDR1/DDR2, power supply and central processing unit (CPU)) disposed on the PCB 600 have distinct thermal effects and module noises, the layout and routing of the various modules may result in different receiving efficiency for antenna 1/antenna 2 (61). In step 41, the probe 15 is used to measure noise power at several sites of the PCB 600 to obtain physical characterization data, which is then subjected to detection analysis in order to find locations where the problems locate and accordingly to fix the problems.

Figure 6B:
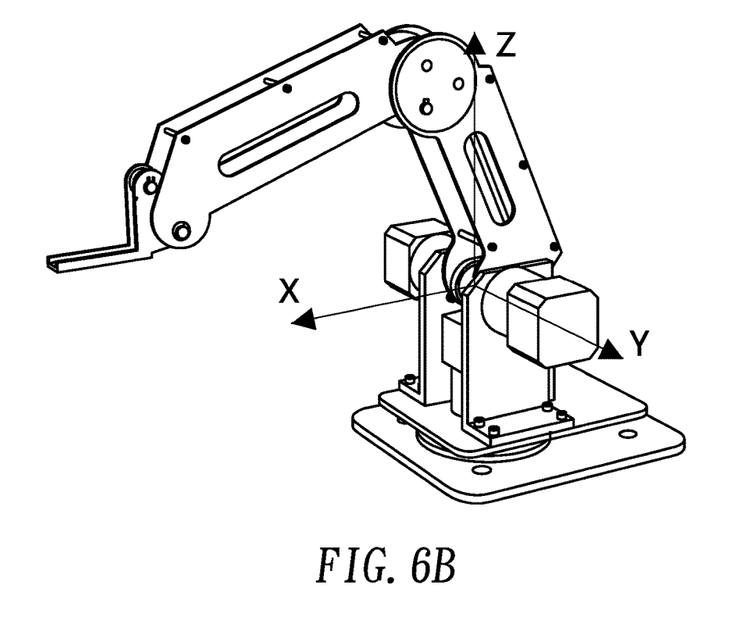
FIG. 6B shows global coordinates of the robot.
Figure 6C:
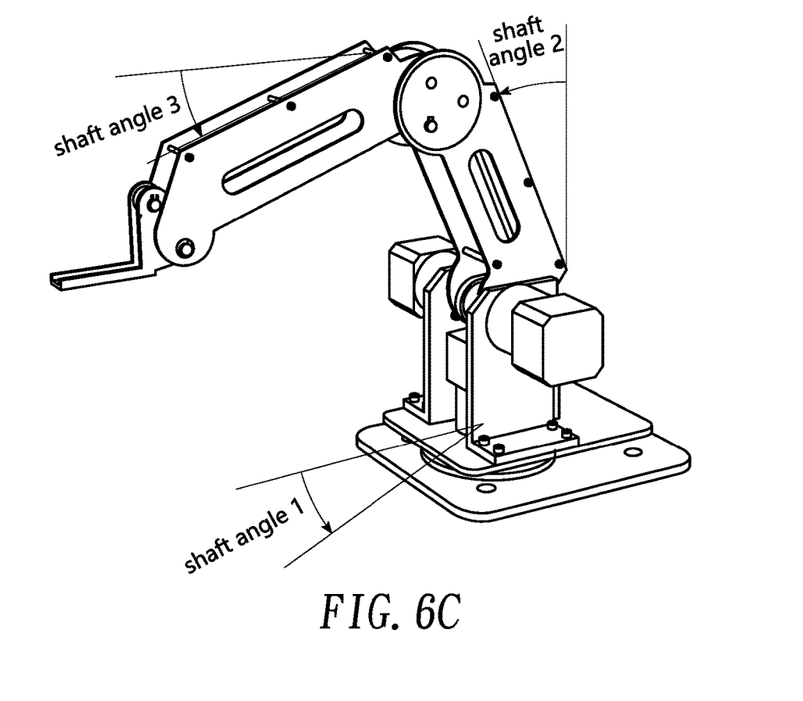
FIG. 6C shows exemplary shaft angles of the robot.
Figure 6D:
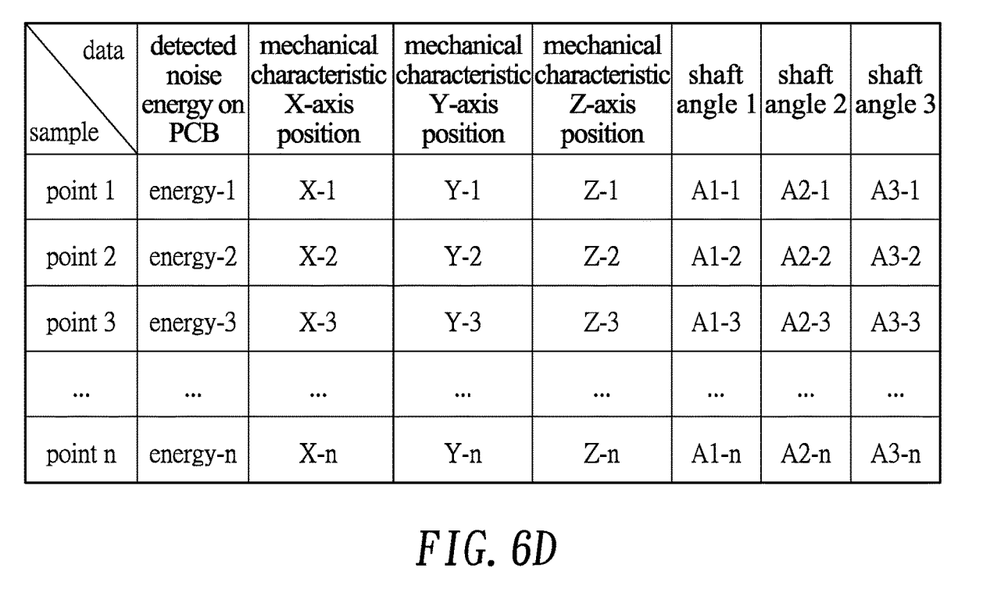
FIG. 6D shows exemplary noise energy obtained in step 41 of FIG. 5B and positions and angles obtained in step 42.

The multi-object tracking system 300 of the embodiment may include a processor 13, such as a computer, which may receive physical characterization data (e.g., noise energy on the PCB 600) measured by the probe 15. Moreover, the processor 13 may obtain physical characterization data (e.g., position and angle) associated with the probe 15 from the robot (step 42). FIG. 6B shows global coordinates of the robot, and FIG. 6C shows exemplary shaft angles of the robot. FIG. 6D shows exemplary noise energy obtained in step 41 of FIG. 5B and positions and angles obtained in step 42.

After step 42 (but before step 43), steps 21-24 of the first embodiment may be optionally performed, in which the radar 11 transmits and receives radio waves to detect a plurality of objects 12, details of which are omitted for brevity. In the present embodiment, the radar 11 may, but not necessarily, be a continuous-wave (CW) radar. Compared to the FM-CW radar, the CW radar may obtain data (e.g., strength and frequency) of less dimension or dimensions.

In step 43, the processor 13 may simplify the physical characterization data (obtained in steps 41 and 42) by using principle component analysis (PCA). Accordingly, at least one dimension of the physical characterization data may be reduced while maintaining characteristics with variance that contributes the most among the data. Therefore, the primary noise sources may be located and associated problems may then be fixed, thus substantially reducing measuring manpower and time cost. The simplified data set through PCA may then be stored in the database 14. In an alternative embodiment, in step 43, the processor 13 may simplify the physical characterization data (obtained in steps 41 and 42) by using independent component analysis (ICA).

Figure 7A:
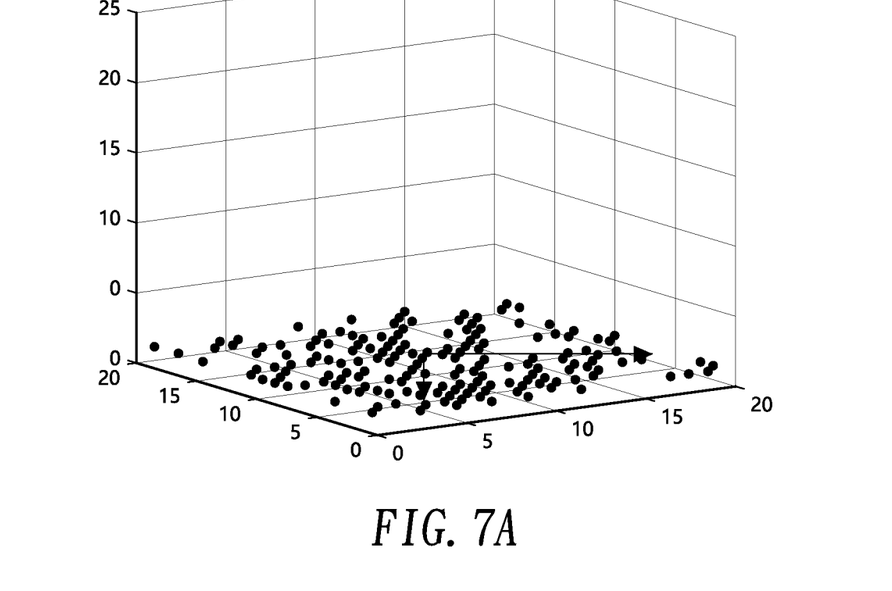
FIG. 7A and FIG. 7B show exemplary simplified data sets through PCA.
Figure 7B:
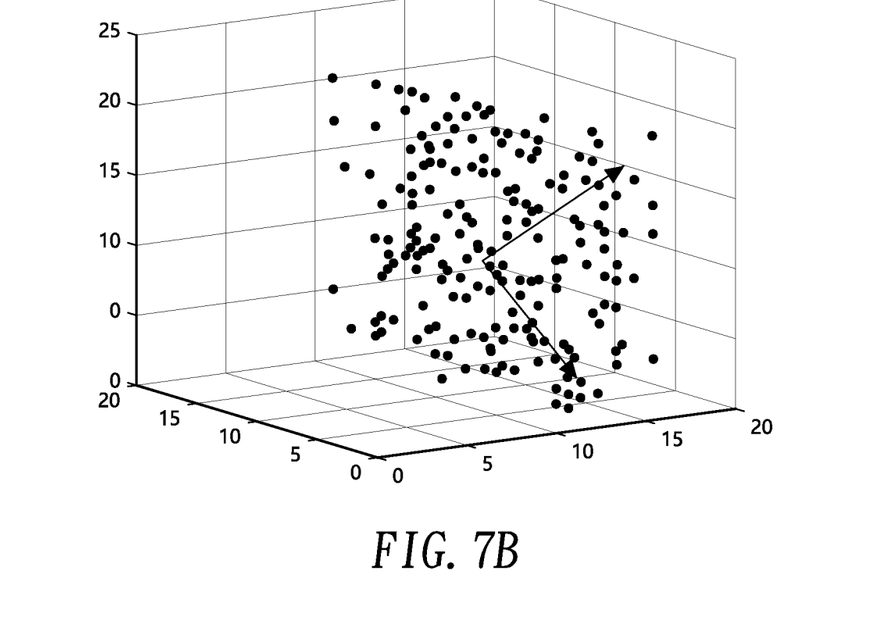

FIG. 7A and FIG. 7B show exemplary simplified data sets through PCA. Specifically, FIG. 7A shows a simplified data set representing a normal event, and FIG. 7B shows a simplified data set representing an abnormal event such as abnormal noise distribution.

Next, in step 44, primary noise distribution is analyzed or system measurement error is determined. The processor 13 may track by comparing a current simplified data set and a stored data set stored in the database 14. If the current simplified data set conforms to the stored data set in the database 14 (i.e., the current simplified data set exists in the database 14), a proper operation is correspondingly performed (step 45). For example, feedback compensation and correction may be performed on the robot arm according to the global coordinates obtained in step 42. If the current simplified data set does not conform to the stored data set in the database 14 (i.e., the current simplified data set does not exist in the database 14), the current simplified data set is defined as a new event according to detection result (step 46), and then stored in the database 14. In the embodiment, the database 14 may perform classification on the datasets by using a machine learning technique.

The principle component analysis (PCA) set forth above (step 24 in the first embodiment or step 43 in the second embodiment) is detailed below. Firstly, an information matrix S may be obtained according to each duration or batch in FIG. 3C or FIG. 6D:

$$S = \begin{bmatrix} D_1 & X_1 & Y_1 & Z_1 \\ D_2 & X_2 & Y_2 & Z_2 \\ \ldots & \ldots & \ldots & \ldots \\ D_n & X_n & Y_n & Z_n \end{bmatrix}$$

A covariance matrix C may then be obtained from the information matrix S:

$$C = S^T S$$

As the covariance matric C is a real symmetric matrix, which may be eigen-decomposed to obtain a diagonal eigenvalue D and an eigenvector U:

$$D = (SU)^T(SU) = U^T S^T S U = U^T C U$$

Subsequently, eigenvalues are arranged from large to small, and eigenvectors are arranged from left to right according to the arrangement of eigenvalues, the front k eigenvectors of which are selected and subjected to compression transformation, thus resulting in simplified data:

$$Z = SU_k = \begin{bmatrix} D_1 & X_1 & Y_1 & Z_1 \\ D_2 & X_2 & Y_2 & Z_2 \\ \ldots & \ldots & \ldots & \ldots \\ D_n & X_n & Y_n & Z_n \end{bmatrix} \times \begin{bmatrix} \ldots & \ldots & \ldots \\ u^1 & \ldots & u^k \\ \ldots & \ldots & \ldots \end{bmatrix}$$

Although specific embodiments have been illustrated and described, it will be appreciated by those skilled in the art that various modifications may be made without departing from the scope of the present invention, which is intended to be limited solely by the appended claims.

What is claimed is:

1. A multi-object tracking method, comprising:
   (a) generating, by a processor, multi-dimensional physical characterization data associated with a plurality of objects, the multi-dimensional physical characterization data being generated according to radio-frequency (RF) transmitting signals transmitted to the objects and reflected RF receiving signals reflected from the objects;
   (b) simplifying, by the processor, the multi-dimensional physical characterization data to reduce at least one dimension thereof, thereby resulting in a simplified data set; and
   (c) tracking, by the processor, the plurality of objects by comparing a current simplified data set and a stored data set in a database;
   wherein in response to a comparison result that the current simplified data set is equal to the stored data set in the database, a predetermined operation is correspondingly performed; in response to a comparison result that the current simplified data set is not equal to the stored data set in the database, the current simplified data set is defined as a new event and stored in the database.

2. The method of claim 1, wherein the step (a) comprises:
   generating and transmitting the radio-frequency (RF) transmitting signals to the objects contained in a robot;
   receiving the RF receiving signals reflected from the objects; and
   extracting the multi-dimensional physical characterization data of the objects at different times according to the RF transmitting signals and the RF receiving signals.

3. The method of claim 2, wherein the RF transmitting signals comprise frequency-modulated continuous-wave (FM-CW) radio signals.

4. The method of claim 2, wherein the extracted multi-dimensional physical characterization data comprises strength, frequency, position and speed.

5. The method of claim 1, wherein the step (a) comprises:
   using a probe disposed on a robot to perform measurement to obtain at least one physical characterization data; and
   obtaining at least one physical characterization data associated with the robot.

6. The method of claim 5, further comprising:
   generating and transmitting the radio-frequency (RF) transmitting signals to the robot composed of the objects;
   receiving the RF receiving signals reflected from the objects; and
   extracting the multi-dimensional physical characterization data of the objects at different times according to the RF transmitting signals and the RF receiving signals.

7. The method of claim 5, wherein the multi-dimensional physical characterization data comprises noise energy measured by the probe, and positions and shaft angles of the robot.

8. The method of claim 1, wherein the step (b) is performed by using principle component analysis (PCA) to simplify the multi-dimensional physical characterization data.

9. The method of claim 1, wherein the step (b) is performed by using independent component analysis (ICA) to simplify the multi-dimensional physical characterization data.

10. The method of claim 1, wherein the database performs classification on datasets by using a machine learning technique.

11. A multi-object tracking system, comprising:
a processor that generates multi-dimensional physical characterization data associated with a plurality of objects according to radio-frequency (RF) transmitting signals transmitted to the objects and reflected RF receiving signals reflected from the objects, and simplifies the multi-dimensional physical characterization data to reduce at least one dimension thereof, thereby resulting in a simplified data set; and
a database that stores a plurality of data sets;
wherein the processor tracks the plurality of objects by comparing a current simplified data set and a stored data set in the database; in response to a comparison result that the current simplified data set is equal to the stored data set in the database, a predetermined operation is correspondingly performed; in response to a comparison result that the current simplified data set is not equal to the stored data set in the database, the current simplified data set is defined as a new event and stored in the database.

12. The system of claim 11, further comprising a radar, which comprises:
a modem that generates the radio-frequency (RF) transmitting signals;
a transmitter that transmits the RF transmitting signals to the objects contained in a robot; and
a receiver that receives the RF receiving signals reflected from the objects;
wherein the modem extracts the multi-dimensional physical characterization data of the objects at different times according to the RF transmitting signals and the RF receiving signals.

13. The system of claim 12, wherein the radar comprises a frequency-modulated continuous-wave (FM-CW) radar.

14. The system of claim 12, wherein the extracted multi-dimensional physical characterization data comprises strength, frequency, position and speed.

15. The system of claim 11, further comprising:
a probe disposed on a robot to perform measurement to obtain at least one physical characterization data;
wherein the robot provides at least one physical characterization data associated therewith.

16. The system of claim 15, further comprising a radar, which comprises:
a modem that generates the radio-frequency (RF) transmitting signals;
a transmitter that transmits the RF transmitting signals to the objects contained in the robot; and
a receiver that receives the RF receiving signals reflected from the objects;
wherein the modem extracts the multi-dimensional physical characterization data of the objects at different times according to the RF transmitting signals and the RF receiving signals.

17. The system of claim 15, wherein the multi-dimensional physical characterization data comprises noise energy measured by the probe, and positions and shaft angles of the robot.

18. The system of claim 11, wherein the processor uses principle component analysis (PCA) to simplify the multi-dimensional physical characterization data.

19. The system of claim 11, wherein the processor uses independent component analysis (ICA) to simplify the multi-dimensional physical characterization data.

20. The system of claim 11, wherein the database performs classification on the datasets by using a machine learning technique.

* * * * *